(12) United States Patent
Asai et al.

(10) Patent No.: US 8,903,645 B2
(45) Date of Patent: Dec. 2, 2014

(54) SYSTEM AND APPARATUS FOR PROCESSING INFORMATION, IMAGE DISPLAY APPARATUS, CONTROL METHOD AND COMPUTER PROGRAM

(75) Inventors: Atsushi Asai, Kanagawa (JP); Junpei Ito, Tokyo (JP); Takeki Osada, Tokyo (JP); Satoshi Suzuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1545 days.

(21) Appl. No.: 12/016,749

(22) Filed: Jan. 18, 2008

(65) Prior Publication Data

US 2008/0183382 A1 Jul. 31, 2008

(30) Foreign Application Priority Data

Jan. 31, 2007 (JP) ................ P2007-022328

(51) Int. Cl.
  *G01C 21/32* (2006.01)
  *G06T 19/00* (2011.01)
  *G01C 21/20* (2006.01)
(52) U.S. Cl.
  CPC .............. *G01C 21/20* (2013.01); *G06T 19/003* (2013.01); *G06T 2210/21* (2013.01)
  USPC ........... 701/411; 701/400; 701/408; 701/409; 701/410; 701/433; 345/419
(58) Field of Classification Search
  CPC combination set(s) only.
  See application file for complete search history.

(56) References Cited

U.S. PATENT DOCUMENTS

| | | | | |
|---|---|---|---|---|
| 5,467,444 A | * | 11/1995 | Kawamura et al. | 345/441 |
| 5,913,918 A | * | 6/1999 | Nakano et al. | 701/208 |
| 5,949,375 A | * | 9/1999 | Ishiguro et al. | 342/457 |
| 6,049,756 A | * | 4/2000 | Libby | 701/301 |
| 6,169,552 B1 | * | 1/2001 | Endo et al. | 345/427 |
| 6,201,544 B1 | * | 3/2001 | Ezaki | 345/419 |
| 6,748,325 B1 | * | 6/2004 | Fujisaki | 701/301 |
| 6,920,392 B2 | * | 7/2005 | Adachi | 701/446 |
| 6,922,157 B2 | * | 7/2005 | Kimura | 340/995.14 |
| 6,999,079 B2 | * | 2/2006 | Kida | 345/427 |
| 7,336,274 B2 | * | 2/2008 | Kida | 345/419 |
| 8,665,260 B2 | * | 3/2014 | McCrae et al. | 345/419 |
| 2002/0070981 A1 | * | 6/2002 | Kida | 345/833 |
| 2002/0075259 A1 | * | 6/2002 | Sakamoto et al. | 345/419 |

(Continued)

FOREIGN PATENT DOCUMENTS

| | | |
|---|---|---|
| JP | 07-191743 | 7/1995 |
| JP | 2002-163683 | 7/2002 |
| JP | 2006-120057 | 5/2006 |

*Primary Examiner* — Khoi Tran
*Assistant Examiner* — Jonathan L Sample
(74) *Attorney, Agent, or Firm* — Finnegan, Henderson, Farabow, Garrett & Dunner, L.L.P.

(57) ABSTRACT

An information processing apparatus includes a three-dimensional map data storage unit for storing three-dimensional map data for use in projecting a three-dimensional space on a map onto a plane, a location information storage unit for storing location information including a type of geographical objects at points spaced at predetermined intervals on the map, a present position storage unit for storing a present position on the map, an operation input receiving unit for receiving an operation input, a collision determination unit for determining the possibility of occurrence of collision in a course from the present position to an end point, a correction unit for correcting the end point based on the determined possibility of occurrence of collision and shifting the present position to the corrected end point, and a drawing unit for drawing a three-dimensional image, the three-dimensional image produced by projecting onto the plane the three-dimensional space on the map.

10 Claims, 12 Drawing Sheets

(56) References Cited

U.S. PATENT DOCUMENTS

| | | | |
|---|---|---|---|
| 2003/0109984 A1* | 6/2003 | Adachi | 701/208 |
| 2004/0125989 A1* | 7/2004 | Kimura | 382/113 |
| 2005/0086227 A1* | 4/2005 | Sullivan et al. | 707/7 |
| 2006/0087507 A1* | 4/2006 | Urano et al. | 345/421 |
| 2006/0092155 A1* | 5/2006 | Kida | 345/419 |
| 2007/0200845 A1* | 8/2007 | Kumagai et al. | 345/419 |
| 2007/0276709 A1* | 11/2007 | Trimby et al. | 705/6 |
| 2010/0118025 A1* | 5/2010 | Smith et al. | 345/418 |

* cited by examiner

SYSTEM AND APPARATUS FOR PROCESSING INFORMATION, IMAGE DISPLAY APPARATUS, CONTROL METHOD AND COMPUTER PROGRAM

CROSS REFERENCES TO RELATED APPLICATIONS

The present invention contains subject matter related to Japanese Patent Application JP 2007-022328 filed in the Japanese Patent Office on Jan. 31, 2007, the entire contents of which are incorporated herein by reference.

BACKGROUND OF THE INVENTION

1. Field of the Invention

The present invention relates to an information processing apparatus and, in particular, to an information processing apparatus, an image display apparatus, an information processing system, a control method and a computer program for drawing an three-dimensional image produced by projecting a three-dimensional space onto a plane.

2. Description of the Related Art

Information processing apparatuses for projecting a streetscape constructed using three-dimensional graphics onto a plane and displaying the streetscape three-dimensionally on a display are available. Some information processing apparatuses allow users to walk freely through streets in a virtual fashion in response to a user operation.

Japanese Unexamined Patent Application Publication No. 2006-120057 discloses an information processing apparatus that generates a three-dimensional image by projecting a three-dimensional space onto a plane and displays the generated three-dimensional image.

SUMMARY OF THE INVENTION

In accordance with the related art, in response to a user operation, a user can walk along a road in streets constructed using three-dimensional graphics.

The user now walks around in the street constructed using the three-dimensional graphics. Unlike driving through, the user can slowly walk through not only roads but also other places such as clear space and walkways. The user can approach a building on each side of the road, but if the user is too close to the building, the three-dimensional image becomes an image of only the wall of the building. A further approach to the building lets the user in the building. The three-dimensional image displayed on a display is entirely filled with a monotonous interior structure of the building.

In a walk-through action in a place where many buildings are present, the three-dimensional image displayed on the display becomes only wall images or interior images of buildings. In such a case, a user has difficulty recognizing the environment around him or her and operating the information processing apparatus. Repeated display of such images typically becomes stress to the user who operates the information processing apparatus.

In a walk-through action in a place where many buildings are present, collision determination is performed as to whether a line of sight collides with the wall of the building. Based on the collision determination results, the user may walk through avoiding colliding the building.

In the collision determination process, a collision determination step is typically performed between a line of sight and a polygon forming an object (geographical object) on the map. Workload involved in the collision determination step is heavy. An application program for the collision determination process, if performed on a personal computer or a built-in device each having limited performance, reduces process speed.

In a walk-through action in a place where many buildings are present, the line of sight may be adjusted taking into consideration the directions of the walls of the buildings and the roads. Calculating the directions of the walls of the buildings and the roads on a real-time basis typically imposes a heavy workload on the apparatus. A reduced process speed thus results. With a slow process speed, travel speed of the walk-through is also reduced, making it difficult for the user to enjoy walk-through.

It is thus desirable to allow the user to move around comfortably in the three-dimensional image in the walk-through in the three-dimensional image produced by projecting the three-dimensional space onto a plane.

In accordance with one embodiment of the present invention, an information processing apparatus, includes a three-dimensional map data storage unit for storing three-dimensional map data for use in projecting a three-dimensional space on a map onto a plane, a location information storage unit for storing location information including a type of geographical objects at points spaced at predetermined intervals on the map corresponding to the three-dimensional map data stored on the three-dimensional map data storage unit with the location information in association with the respective point, a present position storage unit for storing a present position on the map corresponding to the three-dimensional map data stored on the three-dimensional map data storage unit, an operation input receiving unit for receiving an operation input, a collision determination unit for determining the possibility of occurrence of collision in a course from the present position to an end position based on the end point, the present position stored on the present position storage unit and a type of a geographical object contained in the location information stored on the location information storage unit if the operation input receiving unit has received an operation input to proceed from the present position on the map stored on the present position storage unit to the end point on the map, a correction unit for correcting the end point based on the possibility of occurrence of collision determined by the collision determination unit and shifting the present position stored on the present position storage unit to the corrected end point and a drawing unit for drawing a three-dimensional image, the three-dimensional image produced by projecting onto the plane the three-dimensional space on the map corresponding to the present position stored on the present position storage unit based on the three-dimensional map data stored on the three-dimensional map data storage unit. If the operation input to proceed from the present position to the end point on the map is received, the possibility of occurrence of collision in the course is determined. The end point is corrected based on the collision determination results and the present position is updated. The three-dimensional image produced by projecting the three-dimensional space on the map corresponding to the present position onto the plane is thus drawn.

The correction unit may correct the end point by shifting the end point toward the present position stored on the present position storage unit if the collision determination unit determines that a collision is likely to occur. If a collision is likely to occur, the end point is shifted toward the present position.

The location information may contain information at each of points arranged in a grid-like configuration on the map corresponding to the three-dimensional map data stored on the three-dimensional map data storage unit. The collision determination is thus performed using the location information at each of the points in a grid-like configuration on the map.

The collision determination unit may determine the possibility of occurrence of collision depending on whether the type of the geographical object contained in the location information corresponding to the end point is a predetermined type. The collision determination is thus performed depending on whether the type of the geographical object contained in the location information corresponding to the end point is the predetermined type. Upon determining that the type of the geographical object contained in the location information is the predetermined type, the collision determination unit may shift the end point toward the present position and determine whether the type of the geographical object contained in the location information at the shifted end point is the predetermined type, and the correction unit may correct the end point received by the operation input receiving unit to an end point farthest from the present position from among the shifted end points corresponding to the location information that the collision determination unit has determined as containing the predetermined type. The end point received by the operation input receiving unit is corrected to the end point farthest from the present position from among the shifted end points corresponding to the location information that the collision determination unit has determined as containing the predetermined type. The predetermined type may be a road on the map and the location information may include information related to a direction of movement on the road of the map corresponding to the three-dimensional map data stored on the three-dimensional map data storage unit. The correction unit corrects a direction of course from the present position stored on the present position storage unit to the end point received by the operation input receiving unit based on the direction of movement contained in the location information at the corrected end point. The direction of course from the present position to the end point is corrected based on the direction of movement contained in the location information corresponding to the corrected end point.

The location information may include altitude data at the points at the predetermined intervals on the map corresponding to the three-dimensional map data stored on the three-dimensional map data storage unit, and the correction unit may correct a position of a viewpoint in the direction of course based on the altitude data contained in the location information present at a position closest to the present position in the direction of course from the present position stored on the present position storage unit to the end point received by the operation input receiving unit. The position of the viewpoint in the direction of course is corrected based on the altitude data contained in the location information present at the position closest to the present position in the direction of course from the present position to the end point.

The location information may include altitude data at the points at the predetermined intervals on the map corresponding to the three-dimensional map data stored on the three-dimensional map data storage unit, and if a plurality of pieces of altitude data are contained in the location information present at a position closest to the present position in the direction of course from the present position stored on the present position storage unit to the end point received by the operation input receiving unit, the correction unit may correct a position of a viewpoint in the direction of course based on altitude data indicating an altitude closest to an altitude of the present position of the plurality of pieces of the altitude data. If the plurality of pieces of altitude data are contained in the location information present at the position closest to the present position in the direction of course from the present position to the end point, the position of the viewpoint in the direction of course is corrected based on the altitude data, indicating the altitude closest to the altitude of the present position, of the plurality of pieces of the altitude data.

In accordance with one embodiment of the present invention, an image display apparatus includes a three-dimensional map data storage unit for storing three-dimensional map data for use in projecting a three-dimensional space on a map onto a plane, a location information storage unit for storing location information including a type of geographical objects at points spaced at predetermined intervals on the map corresponding to the three-dimensional map data stored on the three-dimensional map data storage unit with the location information in association with the respective point, a present position storage unit for storing a present position on the map corresponding to the three-dimensional map data stored on the three-dimensional map data storage unit, an operation input receiving unit for receiving an operation input, a collision determination unit for determining the possibility of occurrence of collision in a course from the present position to an end position based on the end point, the present position stored on the present position storage unit and a type of a geographical object contained in the location information stored on the location information storage unit if the operation input receiving unit has received an operation input to proceed from the present position on the map stored on the present position storage unit to the end point on the map, a correction unit for correcting the end point based on the possibility of occurrence of collision determined by the collision determination unit and updating the present position stored on the present position storage unit, a drawing unit for drawing a three-dimensional image, the three-dimensional image produced by projecting onto the plane the three-dimensional space on the map corresponding to the present position stored on the present position storage unit based on the three-dimensional map data stored on the three-dimensional map data storage unit and a display unit for displaying the three-dimensional image drawn by the drawing unit. With this arrangement, if the operation input to proceed from the present position to the end point on the map is received, the possibility of occurrence of collision in the course is determined. The end point is then corrected based on the determination results, and the present position is updated accordingly. The three-dimensional image produced by projecting the three-dimensional space on the map corresponding to the present position is thus displayed.

In accordance with one embodiment of the present invention, an information processing system includes a map information data storage apparatus and an information processing apparatus communicating with each other via a predetermined communication line. The map information data storage apparatus includes a three-dimensional map data storage unit for storing three-dimensional map data for use in projecting a three-dimensional space on a map onto a plane and a location information storage unit for storing location information including a type of geographical objects at points spaced at predetermined intervals on the map corresponding to the three-dimensional map data stored on the three-dimensional map data storage unit with the location information in association with the respective point. The information processing apparatus includes a present position storage unit for storing a present position on the map corresponding to the three-dimensional map data stored on the three-dimensional map data storage unit, an operation input receiving unit for receiving an operation input, a collision determination unit for determining the possibility of occurrence of collision in a course from the present position to an end position based on the end point, the present position stored on the present position storage unit and a type of a geographical object contained in the location information stored on the location information storage unit if the operation input receiving unit has received an operation input to proceed from the present position on the map stored on the present position storage unit to the end point on the map, a correction unit for correcting the end point based on the possibility of occurrence of collision determined by the collision determination unit and updating the present position stored on the present position storage unit and a drawing unit for drawing a three-dimensional image, the three-dimensional image produced by projecting onto the plane the three-dimensional space on the map corresponding to the present position stored on the present position storage unit based on the three-dimensional map data stored on the three-dimensional map data storage unit. If the operation input to proceed from the present position to the end point on the map is received in the information processing system, the possibility of occurrence of collision in the course is determined. The end point is then corrected based on the determination results, and the present position is updated accordingly. The three-dimensional image produced by projecting the three-dimensional space on the map corresponding to the present position is thus drawn.

In accordance with embodiments of the present invention, the user can move comfortably around in a virtual fashion in the three-dimensional image produced by projecting the three-dimensional space on a plane.

DESCRIPTION OF THE PREFERRED EMBODIMENTS

The embodiments of the present invention are described below with reference to the drawings.

Figure 1:
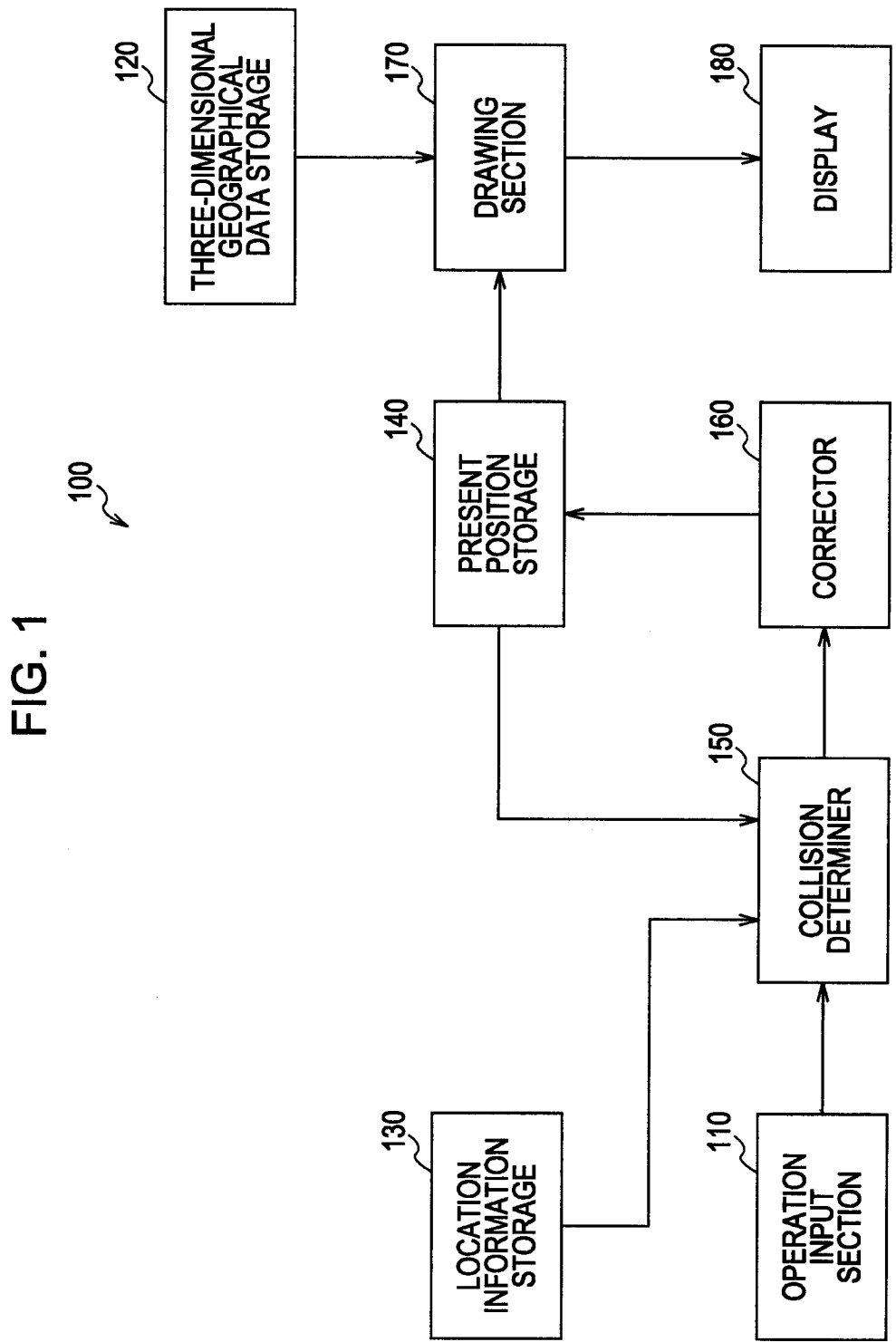
FIG. 1 is a functional block diagram illustrating an information processing apparatus in accordance with one embodiment of the present invention.

FIG. 1 is a functional block diagram illustrating an information processing apparatus 100 in accordance with one embodiment of the present invention. The information processing apparatus 100 is a personal computer including the dedicated display thereof. The information processing apparatus 100 includes an operation input section 110, a three-dimensional geographical data storage 120, a location information storage 130, a present position storage 140, a collision determiner 150, a corrector 160, a drawing section 170 and a display 180.

The operation input section 110 includes a keyboard composed of a variety of keys and a mouse (pointing device). Upon receiving an operation input from the mouse or the like, the operation input section 110 outputs the operation input to the collision determiner 150. In response to an operation of the mouse or the like, a three-dimensional image corresponding to a place desired by a user is displayed on the display 180. The user can thus walk through the map virtually. To take a course from the present position on the map corresponding to the three-dimensional image to an end point, the operation input section 110 receives an operation input to proceed from a present position stored on the present position storage 140 to the end point.

The three-dimensional geographical data storage 120 stores three-dimensional map data for projecting the three-dimensional space on the map onto a plane and outputs the three-dimensional map data to the drawing section 170.

Figure 4:
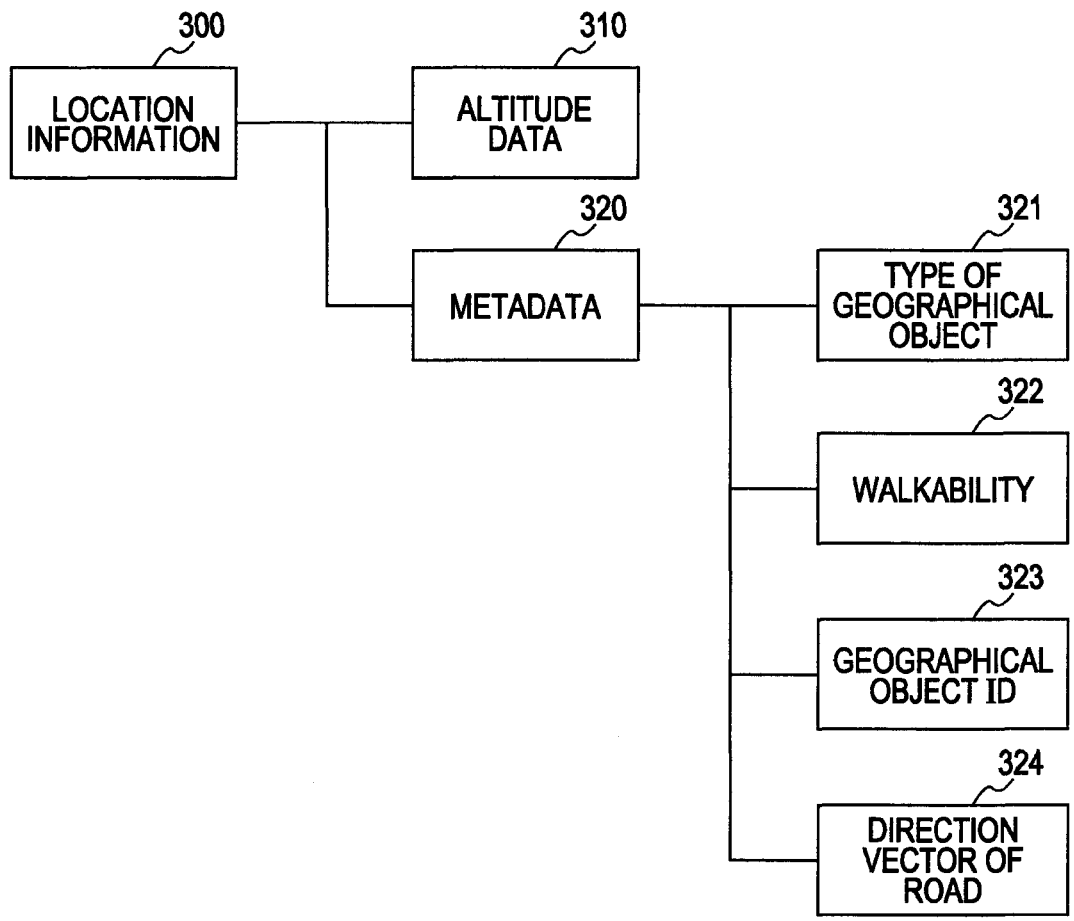
FIGS. 4A and 4B illustrate an example of data structure of location information stored on a location information storage.

The location information storage 130 stores location information at each of points spaced at predetermined intervals on the map corresponding to the three-dimensional image stored on the three-dimensional geographical data storage 120 with the location information in association with the respective point. The location information includes the type of each geographical object and altitude data at each point. The location information storage 130 outputs the location information to the collision determiner 150. The location information stored on the location information storage 130 will be described in detail later with reference to FIG. 4.

The present position storage 140 stores the present position on the map corresponding to the three-dimensional map data stored on the three-dimensional geographical data storage 120. The present position storage 140 outputs the present position information to each of the collision determiner 150 and the drawing section 170. The present position stored on the present position storage 140 is corrected in response to a correction supplied from the corrector 160.

The collision determiner 150 may receive from the operation input section 110 an operation input to proceed from the present position on the map stored on the present position storage 140 to the end point on the map. The collision determiner 150 then determines the possibility of occurrence of collision in the course from the present position to the end point based on the end point, the present position stored on the present position storage 140 and a type of an geographical object contained in location information stored on the location information storage 130. The collision determiner 150 determines the possibility of occurrence of collision depending on whether the type of the geographical object contained in the location information at the end point is road or not. Upon determining that the type of the geographical object contained in the location information at the end point is road, the collision determiner 150 shifts successively the position of the end point toward the present position and determines successively whether the type of the geographical object contained in the location information at the end point is road or not. The determination results are output to the corrector 160.

Based on the collision determination provided by the collision determiner 150, the corrector 160 corrects the end point specified by the operation input and updates the present position stored on the present position storage 140 to shift to the corrected end point. If the collision determiner 150 determines that a collision is likely to occur, the corrector 160 shifts the position of the end point toward the present position stored on the present position storage 140. The corrector 160 corrects the end point received by the operation input section 110 to an end point farthest apart from the present position from among shifted end points having the location information determined to contain the road type by the collision determiner 150. The corrector 160 further corrects a direction of course from the present position stored on the present position storage 140 to the end point received by the operation input section 110 based on a direction of movement contained in the location information at the corrected end point. The corrector 160 corrects a viewpoint in the direction of course based on altitude data contained in the location information at a position closest to the present position in the direction of course from the present position stored on the present position storage 140 to the end point received by the operation input section 110. If a plurality of pieces of altitude data is contained in the location information at the position closest to the present position, the corrector 160 corrects the position of the viewpoint based on the altitude data indicating an altitude closest the altitude at the present position from among the plurality of pieces of altitude data in the direction of course from the present position stored on the present position storage 140 to the end point received by the operation input section 110.

The drawing section 170 draws the three-dimensional image produced by projecting the three-dimensional space on the map to a plane at the present position stored on the present position storage 140, based on the three-dimensional map data stored on the three-dimensional geographical data storage 120.

The display 180 displays the object drawn by the drawing section 170. For example, three-dimensional images of FIGS. 2 and 3 are displayed on the display 180.

The information processing apparatus 100 may include an information output unit. The information processing apparatus 100 causes the information output unit to output image information corresponding to the one to be displayed on the display 180. The information processing apparatus 100 displays on another image display the same image as the one displayed on the display 180.

Figure 2:
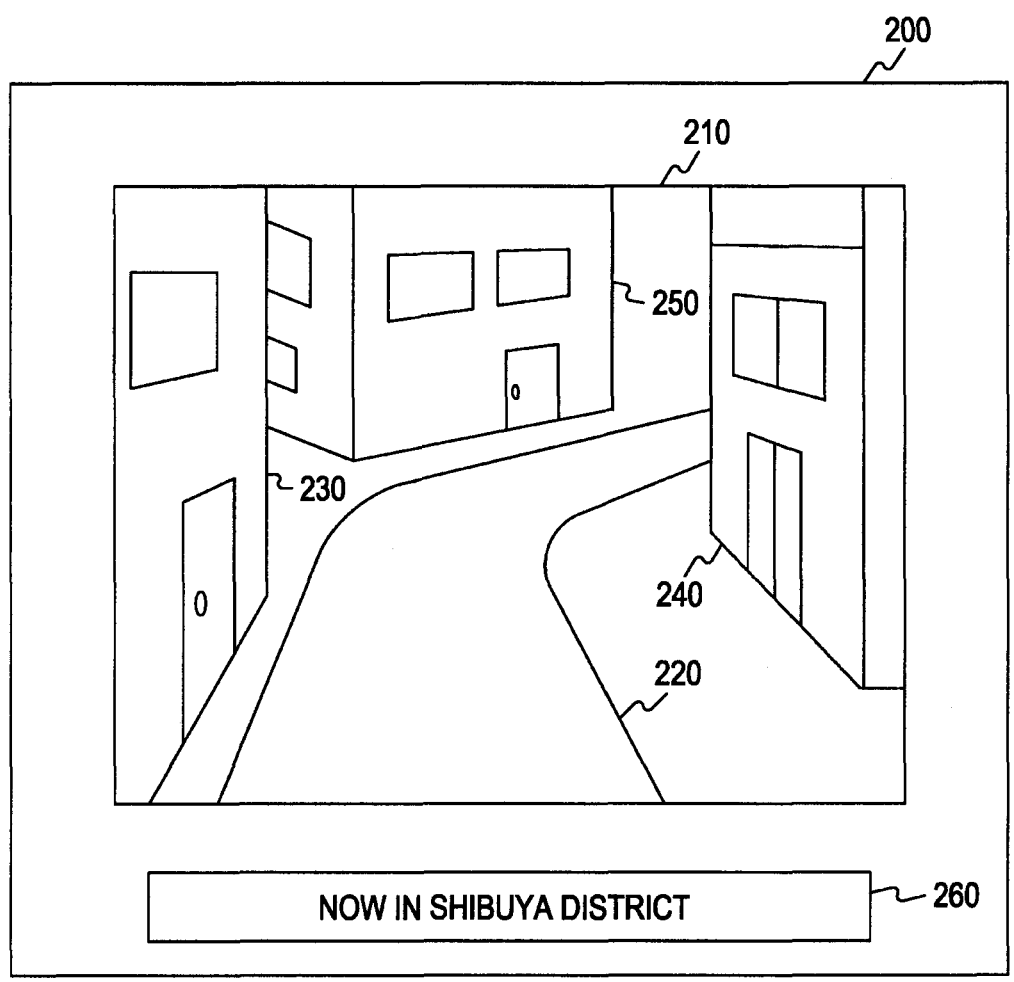
FIG. 2 illustrates an example of display screen displayed on a display.
Figure 3:
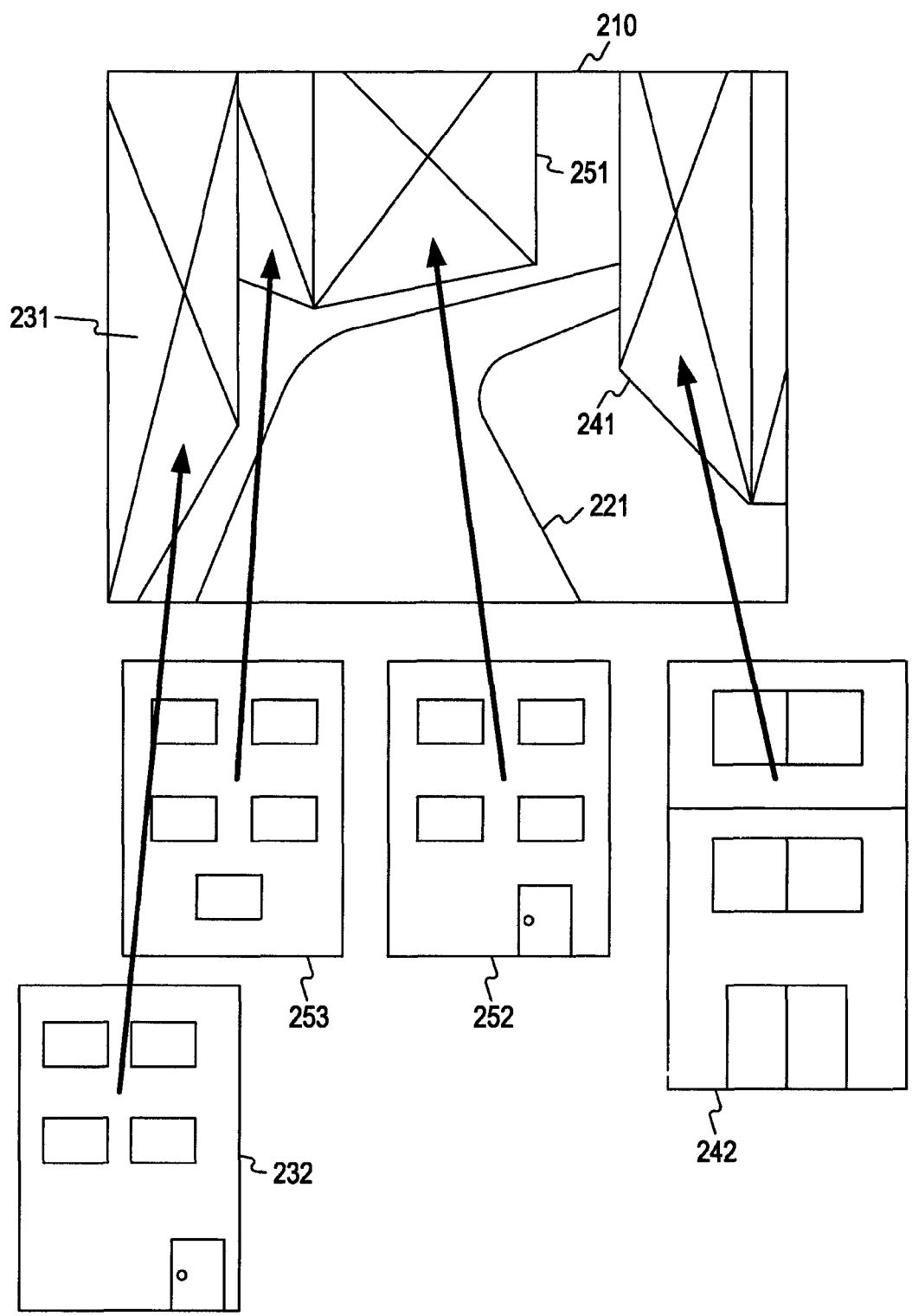
FIG. 3 illustrates an example of texture mapping of buildings drawn in the display screen displayed on the display.

FIG. 2 illustrates a display screen 200 to be presented on the display 180. A three-dimensional image 210 and a present position 260 are drawn on the display screen 200.

The three-dimensional image 210 is a two-dimensional stereoscopic image that is produced when a three-dimensional space is projected on a plane. The three-dimensional image 210 is an actual image on the map viewed at the level of human eyes. For example, buildings 230 through 250 are drawn as the three-dimensional image 210 viewed when the user walks on a road 220 in Shibuya district in Tokyo. The roads, the buildings, etc. are virtual objects.

The present position 260 shows a location of the three-dimensional image 210 displayed on the display screen 200. If a scene that could be viewed when the user walks on the road 220 in the Shibuya district is drawn as the three-dimensional image 210, a message "now in Shibuya district" may be displayed on the present position 260. The present position 260 may be displayed in accordance with the present position stored on the present position storage 140.

FIG. 3 diagrammatically illustrates a texture mapping of the buildings drawn on the display screen 200 displayed on the display 180. Texture mapping refers to attaching a predetermined image to a surface of a model in three-dimensional graphics.

For example, to draw the buildings 230 through 250 contained in the three-dimensional image 210 of FIG. 2, objects 231, 241 and 251 having nothing on the surfaces thereof are arranged in a three-dimensional space based on the three-dimensional map data stored on the three-dimensional geographical data storage 120. Wall surface images 232, 242, 252 and 253 of the respective objects 231, 241 and 251 are attached to the surfaces of the objects 231, 241 and 251. The buildings 230 through 250 are thus drawn as shown in FIG. 2.

The user is now walking through the street by operating the operation input section 110 as displayed in the three-dimensional image 210 on the display 180 of FIG. 2. For example, the user is now walking on the road 220 toward the building 250 in the Shibuya district. The user walks toward the building 250 along the road 220 by operating the operation input section 110 and can proceed without colliding with the building 250. However, the user may be absorbed in watching the streetscape in Shibuya and may fail to operate properly while proceeding along the road 220. The user virtually collides with and enters into the building 250. The three-dimensional image displayed on the display 180 may be filled with monotonous internal images of the building 250. The user has difficulty recognizing the environment around him or her and operating the information processing apparatus. In accordance with the embodiment of the present invention, the location information 300 is used to avoid entering into the building.

FIGS. 4A and 4B illustrate data structure of location information 300 stored on the location information storage 130. FIG. 4B illustrates part of the location information 300. The location information 300 is grid information. The map is partitioned into small segments (for example, 1 m×1 m) by a grid and altitude and type of a geographical object are stored on each segment of the grid as the grid information. The location information 300 thus covers the surface of the map at predetermined intervals. The location information 300 is also stored on the location information storage 130 with each point at the map stored on the three-dimensional geographical data storage 120 associated therewith. More specifically, the location information 300 contains altitude data 310 and metadata 320.

The altitude data 310 is an altitude value of each point on the map. If a building is present at a point on the map, the altitude value of a roof top of the building is stored. If a road runs under a grade separation structure, an altitude value of the road and an altitude value of a road running above the first road are also stored. The same is true of an iron bridge and an overpass. If a road is covered with something, just like a tunnel, an altitude value of something and an altitude value of the tunnel road are stored.

The metadata 320 contains geographical object type 321, walkability 322, geographical object ID 323 and direction vector of road 324. The geographical object is a name of a natural or artificial object present on the ground represented by the map. Stored as examples of the geographical object type 321 of the geographical object are road, building, river, field, etc. The walkability 322 identifies whether the place of interest is walkable or not. In accordance with one embodiment of the present invention, "walkable" is stored for the road and "nonwalkable" is stored for the other objects. The walkability 322 may be omitted, and if a "road" is stored for the geographical object type 321, a "walkable" status may be selected and if an object other than the road is stored from the geographical object type 321, a "nonwalkable" status may be selected. The geographical object ID 323 stores an identification number attached to the geographical object. The direction vector of road 324 stores a value indicating a direction of walk. If the user walks through, for example, the direction vector of road 324 stores a value for correcting a direction of movement. For example, a bearing referenced to zero degree North may be stored for the direction vector of road 324.

Figure 5:
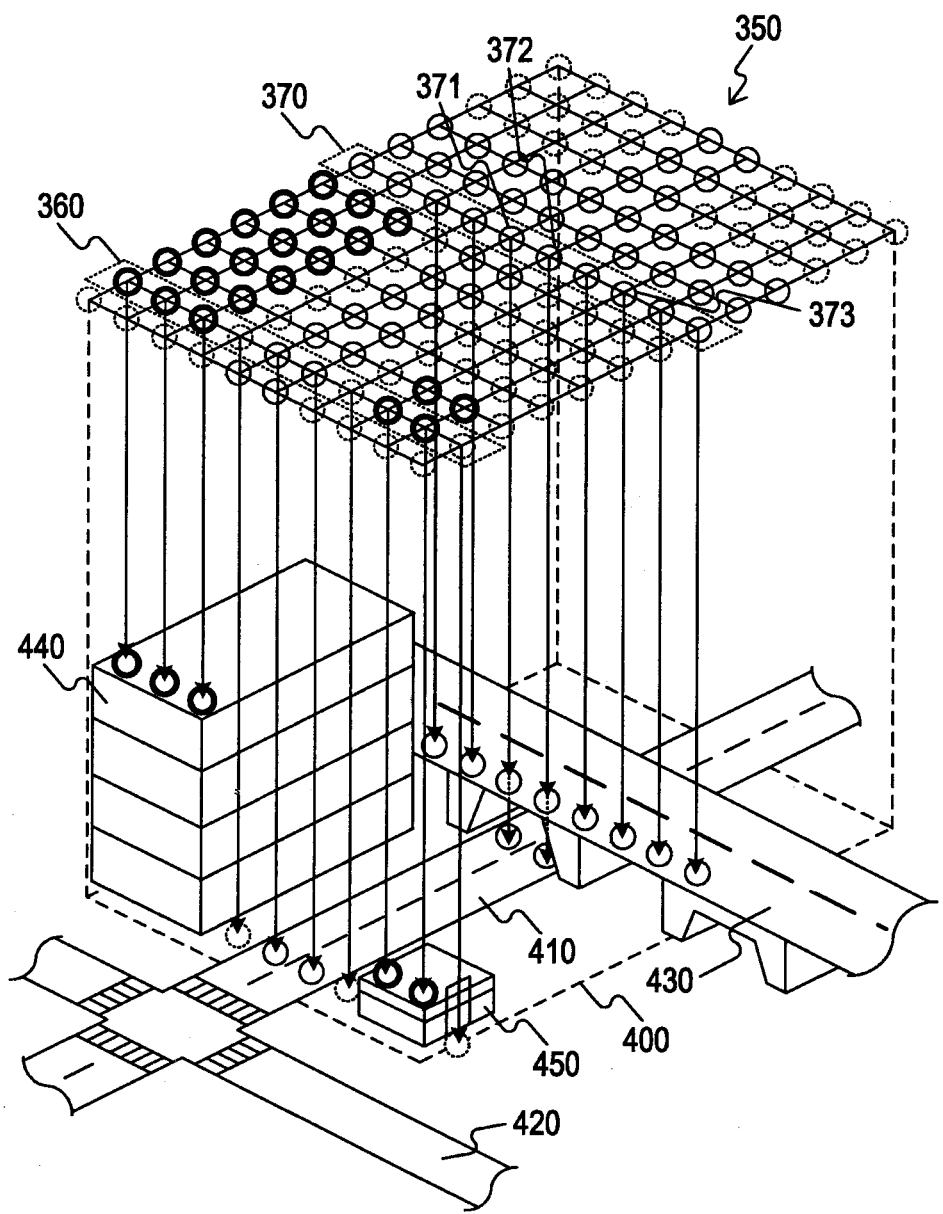
FIG. 5 is a perspective view diagrammatically illustrating a relationship of the location information stored on the location information storage, a map drawn as a three-dimensional image and a geographical object.
Figure 6A:
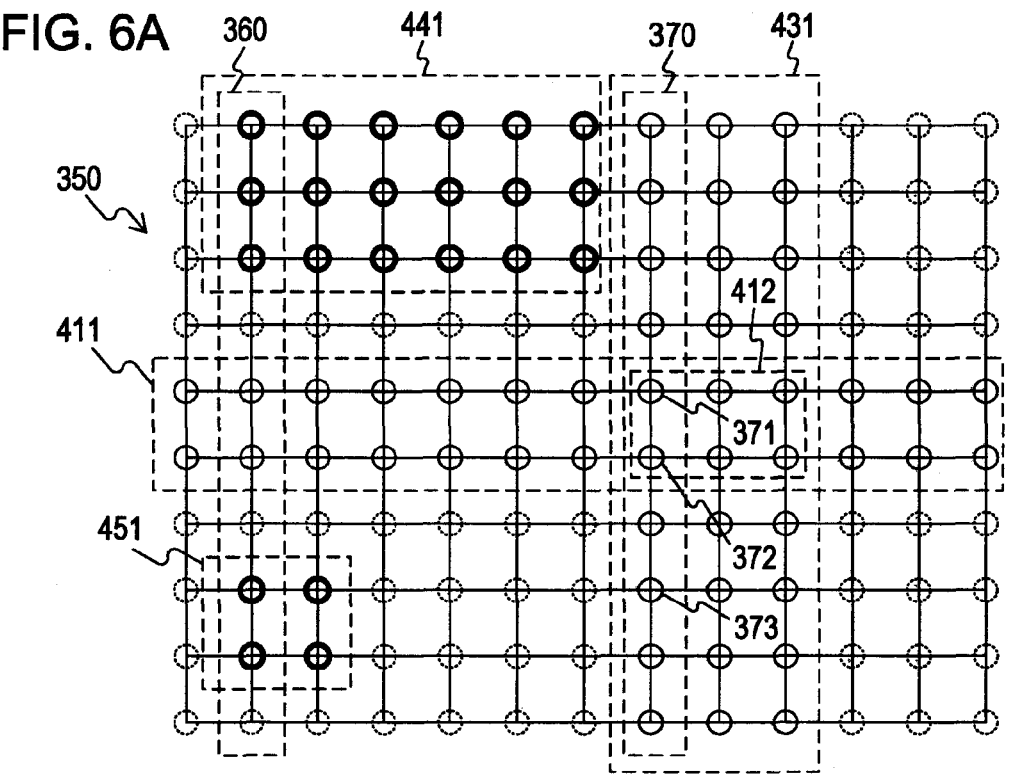
FIGS. 6A and 6B diagrammatically illustrate the relationship of the location information of FIG. 5, the map and the geographical object viewed from above.
Figure 6B:
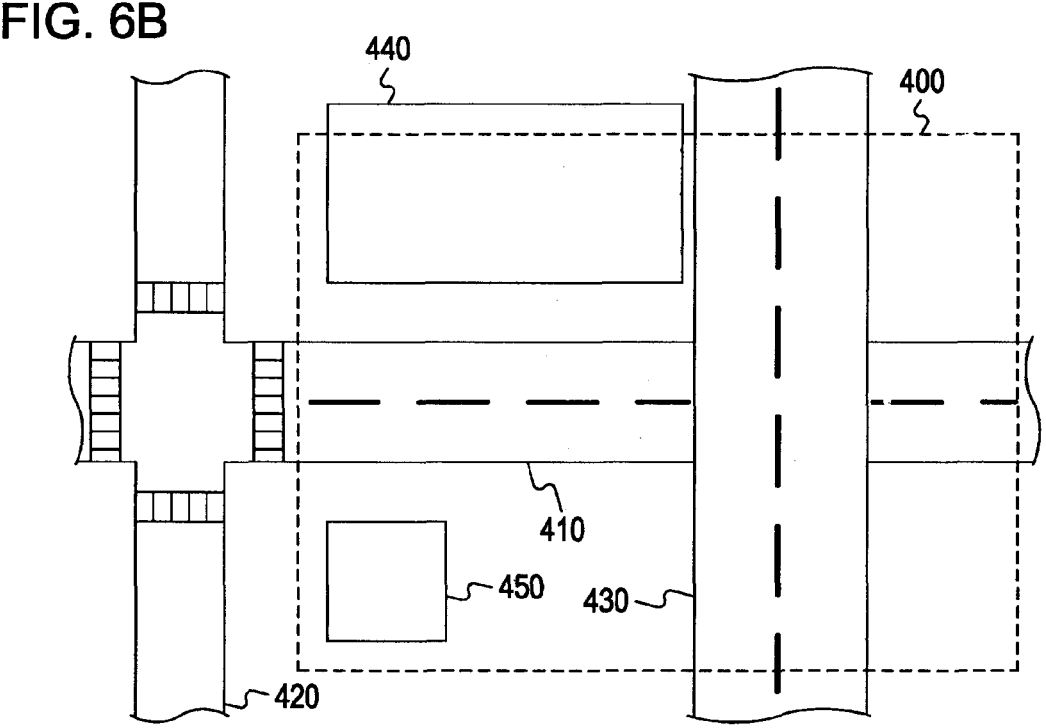

FIG. 5 is a perspective view diagrammatically illustrating the relationship of the location information stored on the location information storage 130, and the map and the geographical object drawn in a three-dimensional image. FIGS. 6A and 6B diagrammatically illustrate the relationship of the location information of FIG. 5 and the map and the geographical object viewed from above.

A road 410 crosses a road 420, and the road 410 crosses a road 430 in a grade separation structure. A building 440 and a convenience store 450 are located on both sides of the road 410. Information groups 350 regarding a predetermined area 400 in this square are now described. In the information groups 350, heavy circles represent location information for each building, thin circles represent location information for each road, and broken circles represent an object other than the road and the building. For example, arrow-headed lines in FIG. 5 indicate correspondence between the a series of location information groups 360 contained in the information groups 350 and the map and the geographical object in the predetermined area 400.

A series of location information groups 370 contained in the information groups 350 contains a variety of information regarding the road 430. Each of location information 371 and location information 372 contains the road 430 and the road 410 at the corresponding location, and the road 430 and the road 410 are walkable. For this reason, each of the location information 371 and the location information 372 contains location information for the road 430 and the road 410.

As shown in FIG. 6A, a location information group 411 is an area containing location information for the road 410, a location information group 431 is an area containing location information for the road 430, a location information group 441 is an area containing location information for the building 440, and a location information group 451 is an area containing location information for the convenience store 450. Each of these information groups is stored on the location information storage 130. As shown in FIG. 4B, for location information 373 contained in the location information group 370, "20.33 m" is stored as the altitude data 310, "expressway" is stored as the geographical object type 321, "walkable" is stored as the walkability 322, "10025148" is stored as the geographical object ID 323 and "74.2 degrees" is stored as the direction vector of road 324.

As for location information contained in location information 412 corresponding to the position at the grade separation structure where the road 410 and the road 430 cross each other, the location information storage 130 contains the location information for each of the road 410 and the road 430.

Figure 7:
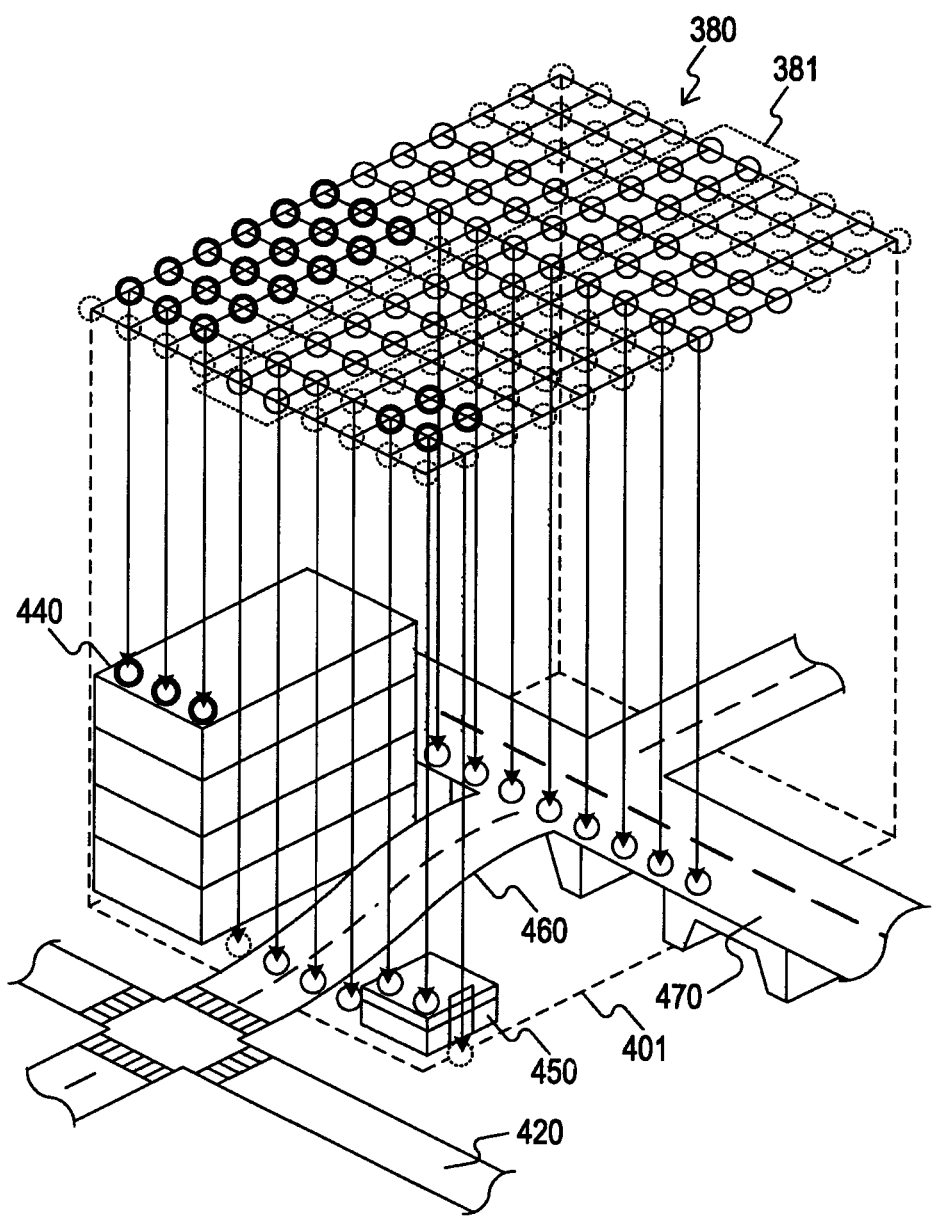
FIG. 7 diagrammatically illustrates the relationship of the location information stored the location information storage, the map drawn as the three-dimensional image and the geographical object.
Figure 8A:
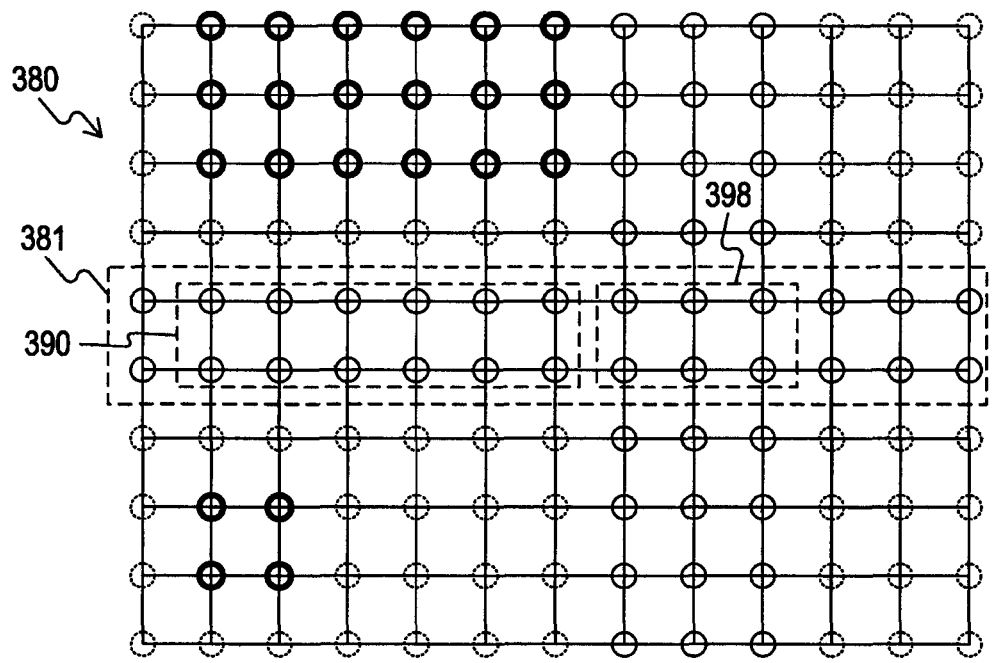
FIGS. 8A and 8B diagrammatically illustrate the relationship of the location information of FIG. 7, the map drawn as the three-dimensional image and the geographical object viewed from above.
Figure 8B:
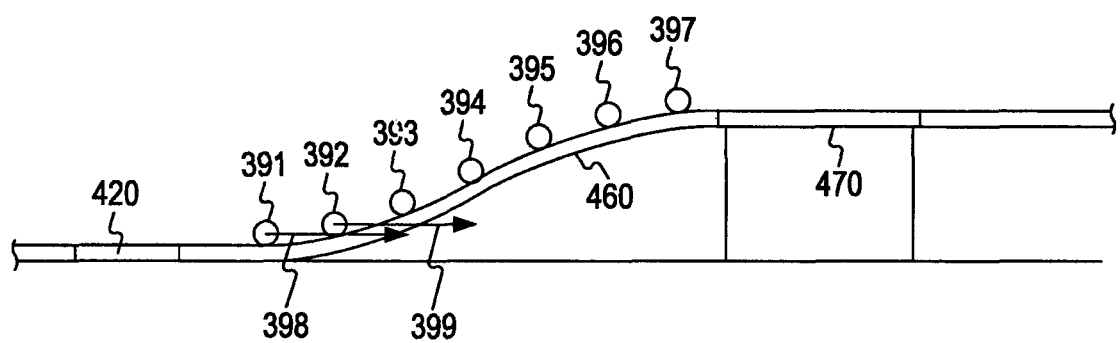

FIG. 7 is a perspective view diagrammatically illustrating the location information stored on the location information storage 130 and the map and the geographical object drawn as the three-dimensional image and shows the map and geographical object partially modified from those of FIG. 5. FIGS. 8A and 8B diagrammatically illustrate the relationship of the location information, and the map and the geographical object of FIG. 7. FIG. 8A illustrates the location information of FIG. 7 viewed from above. FIG. 8B is a diagrammatic lateral view of a road 460.

In the map of FIG. 7, the road 460, used instead of the road 410 of FIG. 5, intersects a road 470. Location information groups 380 are those for a predetermined area 401. The road 460 has an upward slope from the crossing thereof with the road 420 to the crossing thereof with the road 470 as shown in FIGS. 7 and 8B. Location information 391 through location information 397 contained in the location information 390 out of location information groups 381 of the road 460 contain changes in the altitude of the road 460. Unlike the map of FIG. 5, location information contained in a location information group 398 corresponding to the crossing between the road 460 and the road 470 is not a grade separation structure and contains information for a single altitude at each point.

Operating the operation input section 110, the user may now walk through a three-dimensional image of the upward slope of the road 460 of FIG. 7 displayed on the display 180. For example, the user walks toward the road 470 in the course from the road 420 to the road 470. If the user walks in the course along the road 460 operating the operation input section 110, the course may enter into the slope of the road 460 as shown by an arrow-headed line 391 or an arrow-headed line 392 of FIG. 8B.

In accordance with one embodiment of the present invention, location information 391 through location information 397 corresponding to the upward slope of the road 460 are used to avoid such an inconvenience. More specifically, the location information is successively retrieved as the user proceeds, and the position of the viewpoint is corrected based on the altitude data of the retrieved location information. For example, if the user is currently walks from a position corresponding to the location information 391 to a position corresponding to the location information 392 as shown in FIG. 8B, the position of the viewpoint is corrected from an altitude for the location information 391 to an altitude for the location information 392. A resulting three-dimensional image is then displayed on the display 180.

A correction method of the end point is described below with reference to FIGS. 9A and 9B and 10. The end point is corrected if a building is present in the direction of movement when the user walks through the map using the information processing apparatus 100.

Figure 9A:
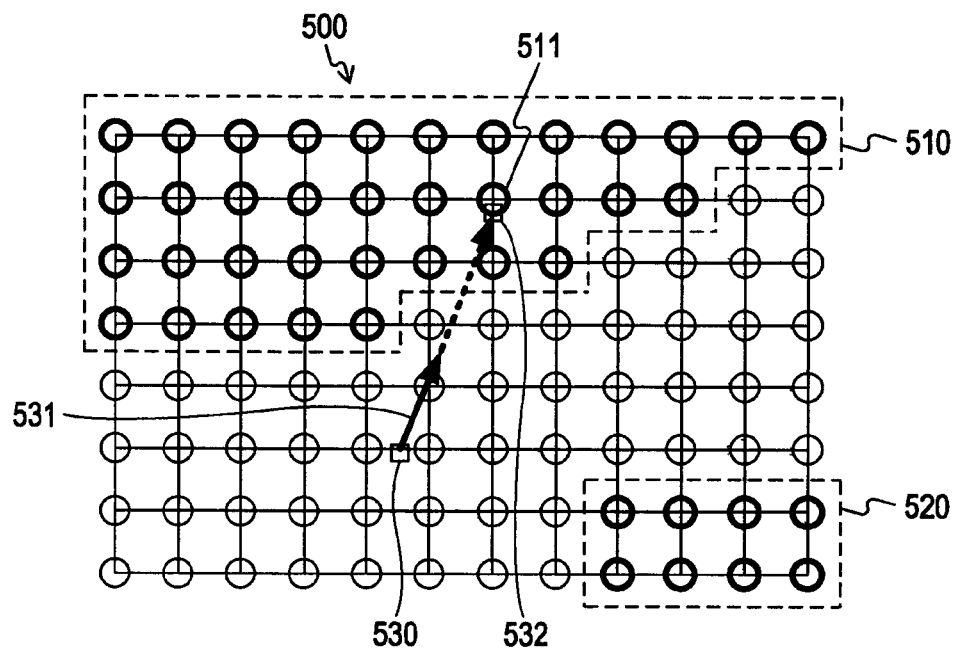
FIGS. 9A and 9B diagrammatically illustrate a correction method of an end point when a user walks through using the information processing apparatus.
Figure 9B:
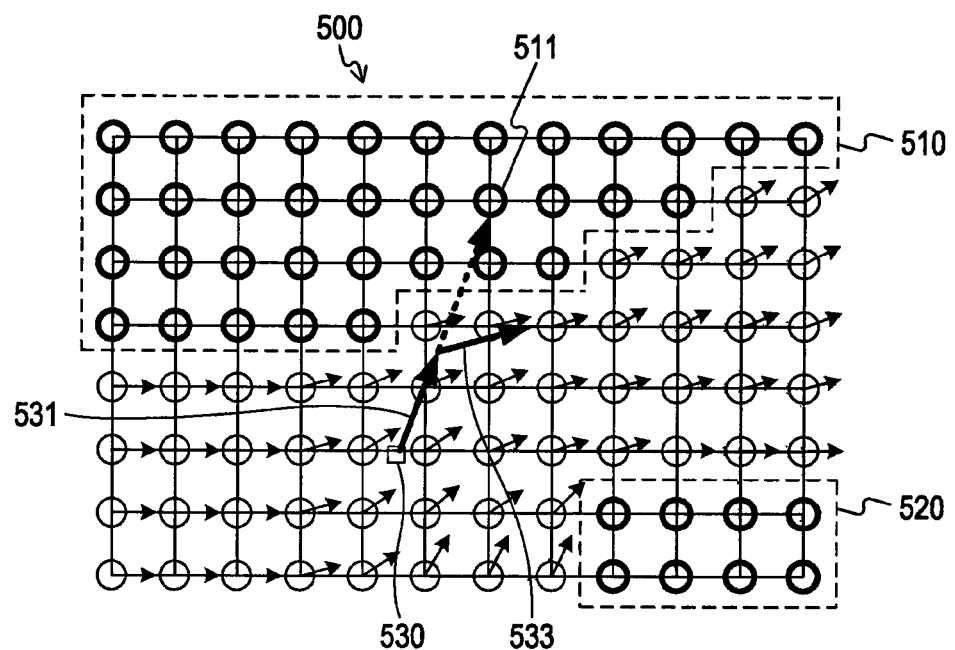

FIGS. 9A and 9B diagrammatically illustrate the correction method of the end point when the walk-through is performed using the information processing apparatus 100. The correction method is described below with reference to location information groups 500 corresponding to an area of a map stored on the three-dimensional geographical data storage 120. There are two buildings on the map, and location information groups 510 and 520 are for the respective buildings. In the location information groups 500, location information for the building is represented heavy circles and location information for the roads is represented by thin circles. A present position 530 serving as an origin for the line-of-sight of the user who walks through the map is represented by a blank square and a line-of-sight vector 531 indicating the direction of line-of-sight (direction of course) is represented by an arrow-headed line. In the location information groups 500 of FIG. 9B, a direction vector of road stored in the location information for the road is represented by an arrow-headed line originated at the center of each thin circle. When the operation input to proceed from the present position to the end point on the map in the three-dimensional image displayed on the display 180 is received by the operation input section 110, the present position on the map goes to the end point on the map in the three-dimensional image.

For example, the user is walking now from the present position 530 in the direction of the line-of-sight vector 531. The user then approaches the wall of the building represented by the location information group 510. If the user continues to proceed, the user collides with and enters into the building. The three-dimensional image displayed on the display 180 may be filled with monotonous interior images of the building. The user then has difficulty recognizing the environment around him or her and operating the information processing apparatus 100.

Location information corresponding to an end point 532 present in the direction of the line-of-sight vector 531 from the present position 530 is retrieved. It is then determined whether the retrieved location information is related to road or building. If it is determined that the retrieved location information is related to building, the present position 530 is not shifted to the end point 532 and stopped in front of a building 510. As shown in FIG. 9B, the direction of course, namely, the line-of-sight vector 531 is corrected in front of the building 510 based on the direction vector of road stored in the location information related to the road present between the present position 530 and the building 510.

If it is determined that the retrieved location information is related to road, the present position 530 is moved in the direction of the line-of-sight vector 531.

Figure 10:
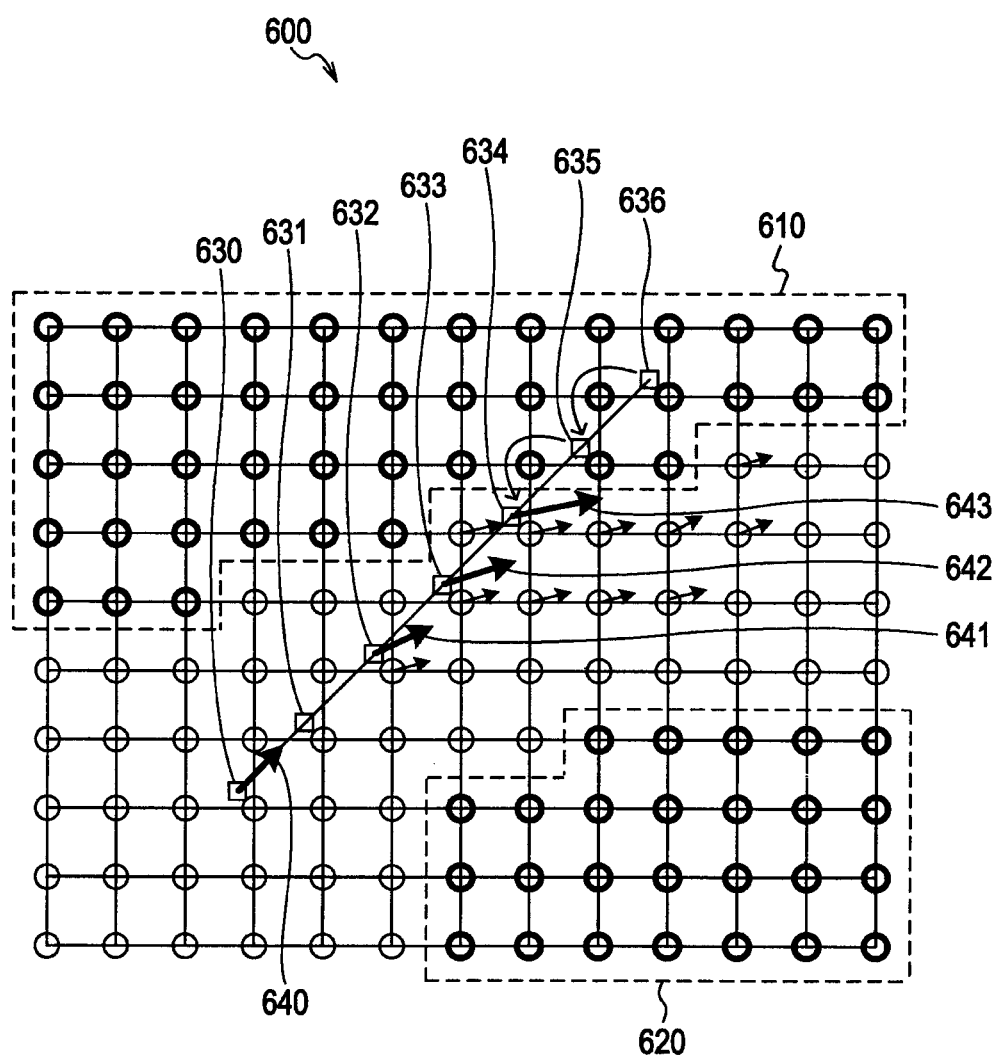
FIG. 10 illustrates the correction method of the end point when the user walks through using the information processing apparatus.

FIG. 10 illustrates a correction method of the end point in the walk-through performed with the information processing apparatus 100. The correction method is described below with reference to location information groups 600 corresponding to an area of a map stored on the three-dimensional geographical data storage 120. There are two buildings on the map, and location information groups 610 and 620 are for the respective buildings. In the location information groups 600, location information for the building is represented heavy circles and location information for the roads is represented by thin circles. A present position serving as a origin for the line-of-sight of the user who walks through the map is represented by a blank square. A line-of-sight vector indicating the direction of line-of-sight is represented by an arrow-headed heavy line. A direction vector of road stored in the location information for the road is represented by an arrow-headed thin line.

For example, the user is walking now from the present position 630 in the direction of the line-of-sight vector 640. The present position successively approaches from the present position 631 through the present position 636. If the user continues to proceed, the user collides with and enters into the building as shown in FIG. 9B. The three-dimensional image displayed on the display 180 may be filled with monotonous interior images of the building. If the operation input to proceed from the present position 630 to the present position (end point) 636 on the map in the three-dimensional image displayed on the display 180 is received by the operation input section 110, the present position proceeds from the present position 630 through the present position 636 at a constant speed. Intervals between the present positions 630 through 636 are set to be equal.

If the operation input is received by the operation input section 110, the location information corresponding to the position 636 as the end point is retrieved. It is then determined whether the retrieved location information is related to road or building. If it is determined that the retrieved illustrate is related to building, the location information at the position 633 immediately before the position 636 is retrieved. It is then determined whether the retrieved location information is related to road or building. In this way, the location information is successively retrieved starting with the position 636 as the end point. If the retrieved location information is related to road, the position corresponding to the location information is corrected as an end point, and the direction of line-of-sight vector is corrected with the end point subsequent correction set as a base point.

For example, the location information at the position 634 is related to road in FIG. 10. In this case, the position 634 corresponding to the location information is corrected as an end point. The direction of a line-of-sight vector 643 is corrected as the direction of course with the position 634 set as the base point. When the present position 630 proceeds in the direction of a line-of-sight vector 640 in the three-dimensional image displayed on the display 180 with the direction of course corrected, the three-dimensional image is drawn on the display 180 so that the present position proceeds in the direction of a line-of-sight vector 643 after completing the course from the position 631 to the position 634.

The present position may be proceeding from the present position 630 in the direction of the line-of-sight vector 640 in the three-dimensional image displayed on the display 180 when the direction of course is changed. For example, the present position is in the middle from the position 631 to the position 634. The line-of-sight vector at the present position may be successively corrected based on the direction vector of road contained in the location information at each point. For example, when the present position reaches the position 632, the line-of-sight vector at the present position is corrected to line-of-sight vector 641. When the present position reaches the position 633, the line-of-sight vector at the present position is corrected to the line-of-sight vector 642. When the present position reaches the position 634, the line-of-sight vector at the present position is corrected to the line-of-sight vector 643.

Operation of the information processing apparatus 100 in one embodiment of the present invention is described with reference to FIG. 11.

Figure 11:
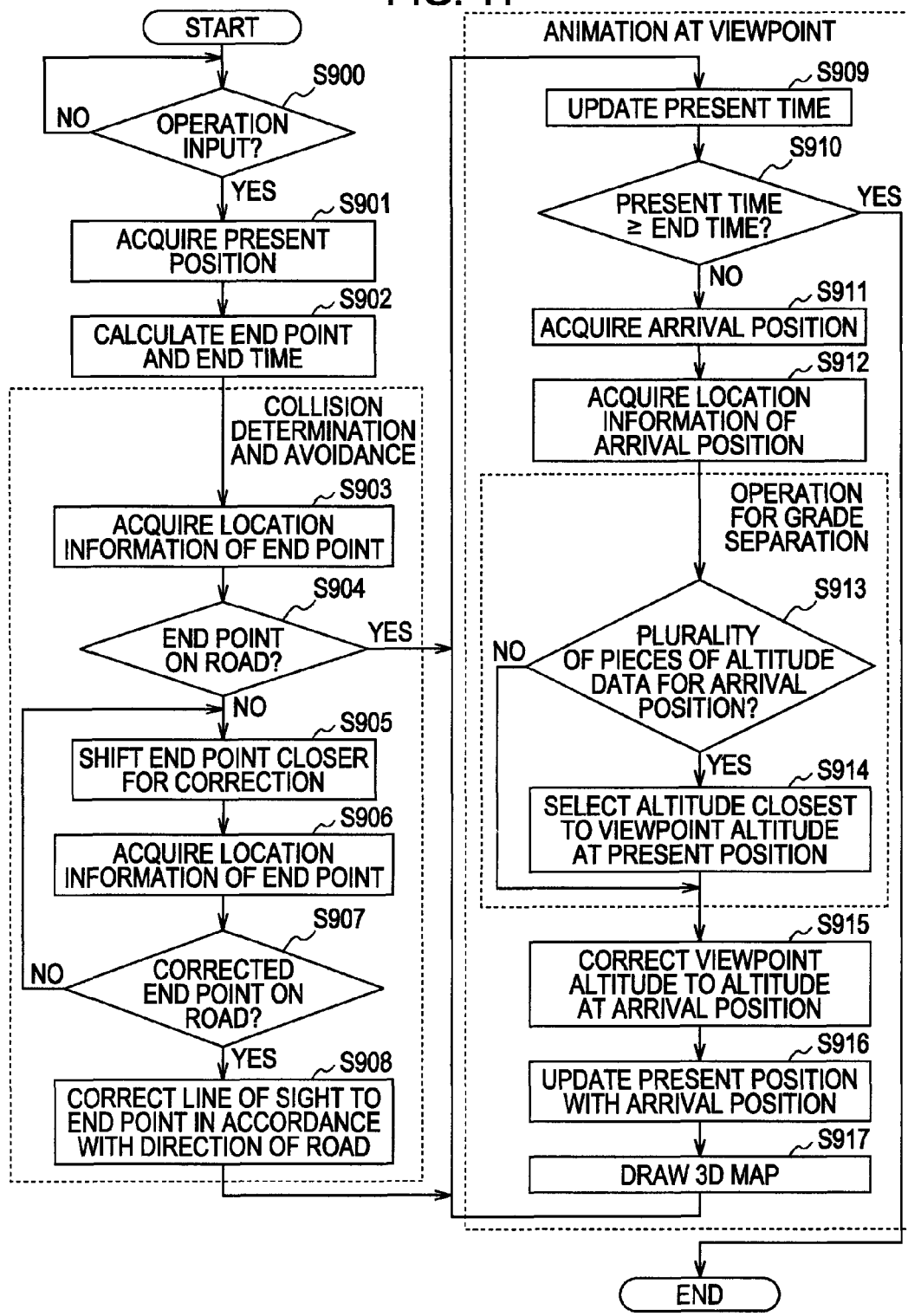
FIG. 11 is a flowchart illustrating a drawing control process performed by the information processing apparatus.

FIG. 11 is a flowchart illustrating a drawing control process of the information processing apparatus 100. The user walks through the map using the information processing apparatus 100.

By operating the operation input section 110, the user walks through the three-dimensional image displayed on the display 180 in the information processing apparatus 100 as shown in FIG. 2.

It is then determined whether an operation input to proceed from the present position to the end point on the map in the three-dimensional image displayed on the display 180 is received by the operation input section 110 (step S900). If it is determined in step S900 that no such operation input has been received, the inputting of such an operation input is continuously monitored. If it is determined in step S900 that such an operation input has been received by the operation input section 110, the present position is retrieved from the present position storage 140 (step S901). For example, the present position is at the position 630 of FIG. 10 and the end point is at the position 636 of FIG. 10.

The end point on the map corresponding to the three-dimensional map data stored on the three-dimensional geographical data storage 120 and end time are calculated based on the retrieved present position and the received end point (step S902). The end time is a point of time after a predetermined time elapsed from the time of retrieval of the present position.

Location information at the calculated end point is retrieved (step S903). If no location information is present at the end point, the location information at a point closest to the end point is retrieved.

It is then determined in step S904 based on the retrieved location information whether the end point is present on the road. If the end point is present on the road (step S904), no correction is required. Processing proceeds to step S909. If it is determined in step S904 that the end point is not present on the road, the correction process is performed so that the end point determined in step S902 is shifted toward a preceding point (step S905). For example, the end point is shifted to a preceding point 635 closer than the first determined end point 636 as shown in FIG. 10.

Location information at the corrected end point is then retrieved (step S906). It is then determined in step S907 based on the retrieved location information whether the corrected end point is present on the road. If the corrected end point is not present on the road (step S907), processing returns to step S905. The correction process of the end point is then repeated (steps S905 through S907). If it is determined in step S907 that the corrected end point is present on the road, the direction of course at the end point is corrected based on the retrieved location information at the end point (step S908). For example, if the corrected end point 635 is not present as shown in FIG. 10, a point preceding the end point 635 becomes the end point 634. Since the point 634 is present on the road, the point 634 is determined as the end point subsequent correction. The direction of course at the end point 634 is corrected to be the direction of the line-of-sight vector 643. In this case, the end time determined in step S902 may be shortened in response to the shifting of the end point. The end time may be obtained by calculating time required to reach the end point from the present position in step S905.

The present time is updated (step S909). Whether the present time has passed the end time is determined by comparing the updated present time with the end time determined in step S902 (step S910). If the present time has passed the end time, the drawing process is completed. If the present time has not passed the end time, an arrival position as a position advanced from the present position by a predetermined distance in the direction of course is retrieved (step S911).

Location information at the arrival position is then retrieved (step S912). If no location information is not present at the arrival position, location information at a position closest to the arrival position is retrieved. It is then determined in step S913 whether a plurality of pieces of altitude data are present in the location information at the arrival position. For example, the location information contained in the location information groups 412 of FIG. 6A contains a plurality of pieces of altitude data. If the location information at the arrival point contains a plurality of pieces of altitude data (step S913), altitude data having an altitude closest to the altitude of the viewpoint at the present position is selected (step S914). The present position may be at a position corresponding to the location information group 412 when the user is walking through the road 410 in the direction from the road 420 to the road 470 as shown in FIG. 5. The altitude data for the road 410 is selected instead of the altitude data for the road 430. If it is determined in step S913 that the location information at the retrieved arrival position does not contain a plurality of pieces of altitude data, the altitude data at the arrival position is used.

The altitude of the viewpoint is corrected using the altitude data contained in the location information at the retrieved arrival position (step S915). The present position stored on the present position storage 140 is updated to the corrected arrival position (step S916). In accordance with the updated present position, the three-dimensional (3D) image is drawn (step S917). Processing returns to step S909. The animation process of the viewpoint is performed (steps S909 through S917).

Steps S903 through S908 are mainly a collision determination and avoidance process, steps S909 through S917 are mainly a viewpoint animation process, and steps S913 through S914 are mainly a grade separation process. In the viewing control process of FIG. 11, each process step is performed in accordance with the present time and the end time as points of time. Alternatively, each process step may be performed in accordance with any period of time.

The three-dimensional map data and the location information may be pre-stored on the storages in the information processing apparatus 100. Three-dimensional map data of a predetermined area (for example, 40 m×40 m) containing a present position and the location information corresponding to the three-dimensional map data may be retrieved from the storage and then stored onto the three-dimensional geographical data storage 120 and the location information storage 130, respectively. Similarly, the three-dimensional map data and the location information may be stored on a storage external to the information processing apparatus 100 and the information processing apparatus 100 may retrieve these pieces of information from the external storage as necessary.

A modification of the present embodiment is described in detail below.

Figure 12:
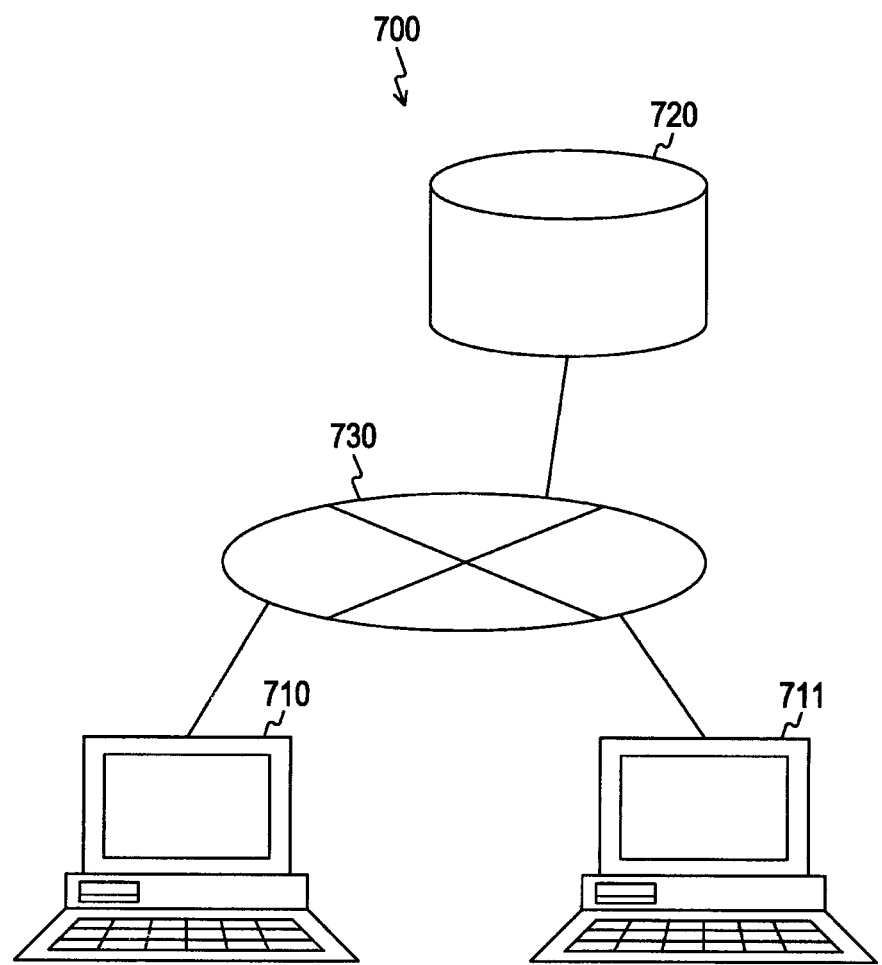
FIG. 12 is a functional block diagram illustrating an information processing system as a modification of the embodiment of the invention.

FIG. 12 is a functional block diagram illustrating an information processing system 700 as the modification of the present embodiment of the invention.

The information processing system 700 includes an information processing apparatus 711, a map database 720 and a network 730. For example, the map database 720 pre-stores the three-dimensional map data and the location information. Information processing apparatuses 710 and 711 may retrieve from the map database 720 via the network 730 three-dimensional map data of a predetermined area (for example, 40 m×40 m) containing a present position and location information corresponding to the three-dimensional map data and then use the retrieved data. A communication network such as the Internet may be used for the network 730.

In accordance with embodiments of the present invention, the location information arranged in a grid-like configuration on the map is retrieved at a high speed when the user walks through the three-dimensional image displayed on the display 180. The information processing apparatus can thus avoid collision using the retrieved location information. The user can avoid entering into the buildings without the need for performing a calculation for a high-workload collision avoidance determination.

By containing the direction of movement in the location information for the road, the line of sight can be adjusted in alignment of the direction of the road before the occurrence of collision. The user can enjoy user-friendly operation.

When the user walks through on an upward slope, the position of the viewpoint of the user can be corrected in accordance with the angle of the slope. The user can thus comfortably walk. The user virtually walks through the three-dimensional image displayed on the display 180 and may feel as if the user actually walks around in the three-dimensional map.

In accordance with embodiments of the present invention, the user can comfortably move around in the three-dimensional image produced by projecting the three-dimensional space on a plane.

In accordance with embodiments of the present invention, the user moves on the map in the three-dimensional image responsive to operation inputs from the operation input section 110. The embodiments of the present invention may be applied when the user moves at a constant speed on the map in the three-dimensional image. In accordance with embodiments of the present invention, the information processing apparatus 100 has been discussed. Each of the embodiments of the present invention is applicable to image display apparatuses displaying a three-dimensional image, such as a television receiver and a cellular phone.

The embodiments of the present invention have been discussed for exemplary purposes only. Features of the embodiments of the present invention are related to specific elements of the present invention as described below. The present invention is not limited to the above described embodiments and various changes and modifications to the embodiments are possible without departing from the scope of the present invention.

The information processing apparatus corresponds to the information processing apparatus 100. The information processing system corresponds to the information processing system 700. The map data storage unit corresponds to the map database 720.

The three-dimensional map data storage unit corresponds to the three-dimensional geographical data storage 120. The location information storage unit corresponds to the location information storage 130. The present position storage unit corresponds to the present position storage 140. The operation input receiving unit corresponds to the operation input section 110. The drawing unit corresponds to the drawing section 170.

The collision determination unit corresponding to the collision determiner 150.

The correction unit corresponds to the corrector 160.

The display unit corresponds to the display 180.

The step of receiving the operation input corresponds to step S900. The step of determining the possibility of occurrence of collision corresponds to step S904. The step of correcting the end point corresponds to step S905. The step of drawing the three-dimensional image corresponds to step S917.

The process steps in the above-referenced embodiments may be considered as a method including a series of steps. The process steps may also be considered as a program for causing the computer to perform the series of steps or a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a three-dimensional map data storage unit for storing three-dimensional map data for use in projecting a three-dimensional space on a map onto a plane;
a location information storage unit for storing location information reflecting types of geographical objects at a plurality of points spaced at predetermined intervals on the map corresponding to the three-dimensional map data stored on the three-dimensional map data storage unit, each point having location information reflecting the geographical object associated with the point;
a present position storage unit for storing a present position on the map corresponding to the three-dimensional map data;
an operation input receiving unit for receiving an operation input;
a collision determination unit for determining the possibility of occurrence of collision in a course from the present position to an end position at an end point, based on the present position and a type of a geographical object contained in the location information corresponding to the end point, if the operation input to proceed from the present position on the map to the end point on the map is received;
a correction unit for correcting the end point when the collision determination unit determines that a collision will occur by:
selecting, from among the plurality of points, a point farthest away from the present position that is of a predetermined type of a geographical object that will not result in a collision as the corrected end point, and
correcting a directional vector for the present position to match a direction of movement contained in the location information at the corrected end point; and
a drawing unit for drawing a three-dimensional image, the three-dimensional image produced by projecting onto the plane the three-dimensional space on the map corresponding to the present position based on the three-dimensional map data.

2. The information processing apparatus according to claim 1, wherein the correction unit shifts the end point toward the present position stored on the present position storage unit if the collision determination unit determines that a collision will occur.

3. The information processing apparatus according to claim 1, wherein the location information comprises information at each of the plurality of points arranged in a grid-like configuration on the map corresponding to the three-dimensional map data stored on the three-dimensional map data storage unit.

4. The information processing apparatus according to claim 1,
wherein the predetermined type is a road on the map,
wherein the location information includes information related to a direction of movement on the road of the map corresponding to the three-dimensional map data stored on the three-dimensional map data storage unit, and
wherein the correction unit corrects a directional vector for the present position stored on the present position storage unit to the direction of movement contained in the location information at the corrected end point.

5. The information processing apparatus according to claim 1,
wherein the location information comprises altitude data at the points at the predetermined intervals on the map corresponding to the three-dimensional map data stored on the three-dimensional map data storage unit, and
wherein the correction unit corrects a position of a viewpoint in the direction of course based on the altitude data contained in the location information present at a position closest to the present position in the direction of course from the present position stored on the present position storage unit to the end point received by the operation input receiving unit.

6. The information processing apparatus according to claim 1, wherein the location information comprises altitude data at the points at the predetermined intervals on the map corresponding to the three-dimensional map data stored on the three-dimensional map data storage unit, and wherein if a plurality of pieces of altitude data are contained in the location information present at a position closest to the present position in the direction of course from the present position stored on the present position storage unit to the end point received by the operation input receiving unit, the correction unit corrects a position of a viewpoint in the direction of course based on altitude data indicating an altitude closest to an altitude of the present position of the plurality of pieces of the altitude data.

7. An image display apparatus, comprising:

a three-dimensional map data storage unit for storing three-dimensional map data for use in projecting a three-dimensional space on a map onto a plane;

a location information storage unit for storing location information reflecting types of geographical objects at a plurality of points spaced at predetermined intervals on the map corresponding to the three-dimensional map data stored on the three-dimensional map data storage unit, each point having location information reflecting the geographical object associated with the point;

a present position storage unit for storing a present position on the map corresponding to the three-dimensional map data;

an operation input receiving unit for receiving an operation input;

a collision determination unit for determining the possibility of occurrence of collision in a course from the present position to an end position at an end point, based on the present position and a type of a geographical object contained in the location information corresponding to the end point, if the operation input to proceed from the present position on the map to the end point on the map is received;

a correction unit for correcting the end point when the collision determination unit determines that a collision will occur by:

selecting, from among the plurality of points, a point farthest away from the present position that is of a predetermined type of a geographical object that will not result in a collision as the corrected end point, and updating the present position by correcting a directional vector for the present position to match a direction of movement contained in the location information at the corrected end point;

a drawing unit for drawing a three-dimensional image, the three-dimensional image produced by projecting onto the plane the three-dimensional space on the map corresponding to the present position based on the three-dimensional map data; and a display unit for displaying the drawn three-dimensional image.

8. An information processing system, comprising a map information data storage apparatus and an information processing apparatus communicating with each other via a predetermined communication line, the map information data storage apparatus including:

a three-dimensional map data storage unit for storing three-dimensional map data for use in projecting a three-dimensional space on a map onto a plane; and a location information storage unit for storing location information reflecting types of geographical objects at a plurality of points spaced at predetermined intervals on the map corresponding to the three-dimensional map data stored on the three-dimensional map data storage unit, each point having location information reflecting the geographical object associated with the point; and the information processing apparatus including:

a present position storage unit for storing a present position on the map corresponding to the three-dimensional map data;

an operation input receiving unit for receiving an operation input;

a collision determination unit for determining the possibility of occurrence of collision in a course from the present position to an end position at an end point, based on the present position and a type of a geographical object contained in the location information corresponding to the end point, if the operation input to proceed from the present position on the map to the end point on the map is received;

a correction unit for correcting the end point when the collision determination unit determines that a collision will occur by:

selecting, from among the plurality of points, a point farthest away from the present position that is of a predetermined type of a geographical object that will not result in a collision as the corrected end point, and updating the present position by correcting a directional vector for the present position to match a direction of movement contained in the location information at the corrected end point; and a drawing unit for drawing a three-dimensional image, the three-dimensional image produced by projecting onto the plane the three-dimensional space on the map corresponding to the present position based on the three-dimensional map data.

9. A control method of an information processing apparatus including a three-dimensional map data storage unit storing three-dimensional map data for use in projecting a three-dimensional space on a map onto a plane, a location information storage unit storing location information reflecting types of geographical objects at a plurality of points spaced at predetermined intervals on the map corresponding to the three-dimensional map data stored on the three-dimensional map data storage unit, each point having location information reflecting the geographical object associated with the point and a present position storage unit storing a present position on the map corresponding to the three-dimensional map data stored on the three-dimensional map data storage unit, the control method comprising steps of:

receiving an operation input;

determining, via a processor the possibility of occurrence of collision in a course from the present position to an end position at an end point, based on the present position and a type of a geographical object contained in the location information corresponding to the end point, if an operation input to proceed from the present position on the map stored on the present position storage unit to the end point on the map has been received;

correcting, via a processor, the end point when it is determined that a collision will occur by:

selecting, from among the plurality of points, a point farthest away from the present position that is of a predetermined type of a geographical object that will not result in a collision as the corrected end point, and updating the present position by correcting a directional vector for the present position to match a direction of movement contained in the location information at the corrected end point; and drawing a three-dimensional image, the three-dimensional image produced by projecting onto the plane the three-dimensional space on the map corresponding to the present position based on the three-dimensional map data.

10. A non-transitory computer-readable storage medium storing instructions executable by a processor for causing a computer to perform a control method of an information processing apparatus including a three-dimensional map data storage unit storing three-dimensional map data for use in projecting a three-dimensional space on a map onto a plane, a location information storage unit storing location information reflecting types of geographical objects at a plurality of points spaced at predetermined intervals on the map corresponding to the three-dimensional map data stored on the three-dimensional map data storage unit, each point having location information reflecting the geographical object associated with the location point and a present position storage unit storing a present position on the map corresponding to the three-dimensional map data stored on the three-dimensional map data storage unit, the control method comprising steps of:

receiving an operation input;

determining the possibility of occurrence of collision in a course from the present position to an end position at an end point, based on the present position and a type of a geographical object contained in the location information corresponding to the end point, if an operation input to proceed from the present position on the map stored on the present position storage unit to the end point on the map has been received;

correcting the end point when it is determined that a collision will occur by:

selecting, from among the plurality of points, a point farthest away from the present position that is of a predetermined type of a geographical object that will not result in a collision as the corrected end point, and updating the present position by correcting a directional vector for the present position to match a direction of movement contained in the location information at the corrected end point; and drawing a three-dimensional image, the three-dimensional image produced by projecting onto the plane the three-dimensional space on the map corresponding to the present position based on the three-dimensional map data.

\* \* \* \* \*